(12) United States Patent
Ohsawa et al.

(10) Patent No.: US 10,658,674 B2
(45) Date of Patent: May 19, 2020

(54) ELECTRODE

(71) Applicant: NISSAN MOTOR CO., LTD., Yokohama-shi, Kanagawa (JP)

(72) Inventors: Yasuhiko Ohsawa, Kanagawa (JP); Hajime Satou, Kanagawa (JP); Hiroshi Akama, Kanagawa (JP); Hideaki Horie, Kanagawa (JP); Yusuke Mizuno, Kyoto (JP); Hiroshi Fukumoto, Kyoto (JP); Masatoshi Okura, Kyoto (JP); Yasuhiro Shindo, Kyoto (JP); Yasuhiro Tsudo, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 305 days.

(21) Appl. No.: 15/506,514

(22) PCT Filed: Aug. 21, 2015

(86) PCT No.: PCT/JP2015/073462
§ 371 (c)(1),
(2) Date: Feb. 24, 2017

(87) PCT Pub. No.: WO2016/031690
PCT Pub. Date: Mar. 3, 2016

(65) Prior Publication Data
US 2017/0279125 A1  Sep. 28, 2017

(30) Foreign Application Priority Data

Aug. 25, 2014 (JP) .................................. 2014-170646

(51) Int. Cl.
*H01M 4/66* (2006.01)
*H01M 4/62* (2006.01)
(Continued)

(52) U.S. Cl.
CPC ............. *H01M 4/668* (2013.01); *H01M 4/02* (2013.01); *H01M 4/0404* (2013.01); *H01M 4/13* (2013.01);
(Continued)

(58) Field of Classification Search
CPC ..... H01M 2004/027; H01M 2004/028; H01M 2004/029; H01M 4/02; H01M 4/0404;
(Continued)

(56) References Cited

U.S. PATENT DOCUMENTS 4,877,695 A * 10/1989 Cipriano ................. H01M 4/13
429/102
5,464,706 A * 11/1995 Dasgupta ............... H01M 4/663
429/209
(Continued)

FOREIGN PATENT DOCUMENTS

CN 102388491 A 3/2012
EP 2 568 520 A1 3/2013
(Continued)

*Primary Examiner* — Carlos Barcena
(74) *Attorney, Agent, or Firm* — Foley & Lardner LLP

(57) ABSTRACT

An electrode for improving the durability of a battery includes a current collector and an active material layer. The current collector has a conductive resin layer including a polymer material and a conductive filler. The electrode further includes a conductive member, which is in electrical contact with the conductive filler, between the current collector and the active material layer.

7 Claims, 4 Drawing Sheets

(51) Int. Cl.
  *H01M 4/137* (2010.01)
  *H01M 4/139* (2010.01)
  *H01M 4/13* (2010.01)
  *H01M 4/02* (2006.01)
  *H01M 4/04* (2006.01)

(52) U.S. Cl.
  CPC ........... *H01M 4/137* (2013.01); *H01M 4/139* (2013.01); *H01M 4/624* (2013.01); *H01M 4/66* (2013.01); *H01M 2004/027* (2013.01); *H01M 2004/028* (2013.01); *H01M 2004/029* (2013.01)

(58) Field of Classification Search
  CPC ........ H01M 4/13; H01M 4/137; H01M 4/139; H01M 4/624; H01M 4/66; H01M 4/668
  See application file for complete search history.

(56) References Cited

U.S. PATENT DOCUMENTS

| | | | |
|---|---|---|---|
| 5,824,120 A * | 10/1998 | Mitchell | H01M 4/13 29/623.1 |
| 8,445,139 B2 | 5/2013 | Hosaka et al. | |
| 2003/0096168 A1* | 5/2003 | Kasamatsu | H01M 4/366 429/231.95 |
| 2005/0048367 A1* | 3/2005 | Igaki | H01M 4/0404 429/212 |
| 2006/0099510 A1* | 5/2006 | Naarmann | H01M 4/0404 429/232 |
| 2007/0111102 A1* | 5/2007 | Inoue | H01M 4/362 429/232 |
| 2009/0297952 A1* | 12/2009 | Yasunaga | H01M 4/02 429/231.8 |
| 2012/0034521 A1 | 2/2012 | Matsuyama et al. | |
| 2012/0208082 A1 | 8/2012 | Honda | |
| 2014/0099537 A1 | 4/2014 | Kato et al. | |

FOREIGN PATENT DOCUMENTS

| | | | |
|---|---|---|---|
| EP | 2 755 261 A1 | 7/2014 | |
| JP | 61195564 A * | 8/1986 | ............ H01M 4/668 |
| JP | 2000-357517 A | 12/2000 | |
| JP | 2006-190649 | 7/2006 | |
| JP | 2010-170833 A | 8/2010 | |
| JP | 2010-277862 A | 12/2010 | |
| WO | WO 2011/062065 A1 | 5/2011 | |
| WO | WO 2012/161181 A1 | 11/2012 | |

* cited by examiner

ELECTRODE

TECHNICAL FIELD

The present invention relates to an electrical connection structure.

BACKGROUND ART

In recent years, expectations are growing for widespread use of various electric vehicles with a view to solving environment and energy problems. As a key to wide spread use of these electric vehicles, vigorous development of secondary batteries as an in-vehicle power source such as a power source for driving a motor is under way. However, in order for the electric vehicles to gain wide acceptance, the batteries need to have higher performance and be less expensive. Further, there is a need for the single-charge travel distance of the electric vehicles to approach that of gasoline engine vehicles, giving rise to the demand for batteries having higher energy density. In order to allow a battery to have a high energy density, there is a need to reduce a battery member, which is not directly involved in a battery reaction, as much as possible. A bipolar type secondary battery has been proposed as a battery in which a current collecting tab of a battery single cell, a bus bar for connection between single cells, and the like can be saved and which is very excellent in volume efficiency and suitable for vehicle installation. The bipolar type secondary battery uses a bipolar type electrode in which a positive electrode is formed on one surface of one current collector and a negative electrode is formed on the other surface thereof. Further, the bipolar type secondary battery has a structure in which a plurality of the bipolar type electrodes are laminated via a separator including an electrolyte layer such that the positive electrode and the negative electrode face each other. Therefore, in this bipolar type secondary battery, one battery cell (single battery) is formed by the positive electrode, the negative electrode, and the separator (the electrolyte layer) which are provided between the current collector and the current collector.

For example, in order to improve an output density per weight of the secondary battery, Patent Literature 1 has proposed to use a current collector containing a polymer material and a conductive filler.

CITATION LIST

Patent Literatures

Patent Literature 1: JP 2006-190649 A (corresponding to US 2008/0220330 A1)

SUMMARY OF INVENTION

Technical Problem

However, in the technique described in Patent Literature 1, the output performance of the battery is not sufficient and thus there is a demand for further improvement in the output performance.

In this regard, an object of the present invention is to provide a means for improving the output performance of a battery.

Solution to Problem

The present inventors conducted intensive studies. As a result, they found that the above-described problem is solved by an electrical connection structure in which a conductive member, which is in electrical contact with a conductive filler included in a conductive resin layer, is provided with respect to a current collector including the conductive resin layer.

BRIEF DESCRIPTION OF DRAWINGS

In FIG. 1, reference numeral 10a represents a lithium ion secondary battery; reference numeral 11 represents a positive electrode current collector; reference numeral 12 represents a negative electrode current collector; reference numeral 13 represents a positive electrode active material layer; reference numeral 14 represents a positive electrode conductive member; reference numeral 15 represents a negative electrode active material layer; reference numeral 16 represents a negative electrode conductive member; reference numeral 17 represents an electrolyte layer; reference numeral 19 represents a single battery layer; reference numeral 21 represents a power generating element; reference numeral 25 represents a positive electrode current collecting plate; reference numeral 27 represents a negative electrode current collecting plate; and reference numeral 29 represents a battery outer casing material.

In FIG. 2, reference numeral 10b represents a lithium ion secondary battery; reference numeral 11 represents a positive electrode current collector; reference numeral 11a represents an outermost layer current collector of the positive electrode side; reference numeral 11b represents an outermost layer current collector of the negative electrode side; reference numeral 13 represents a positive electrode active material layer; reference numeral 14 represents a positive electrode conductive member 14; reference numeral 15 represents a negative electrode active material layer; reference numeral 16 represents a negative electrode conductive member; reference numeral 17 represents an electrolyte layer; reference numeral 19 represents a single battery layer; reference numeral 21 represents a power generating element; reference numeral 25 represents a positive electrode current collecting plate; reference numeral 27 represents a negative electrode current collecting plate; reference numeral 29 represents a battery outer casing material; and reference numeral 31 represents a sealing portion.

In FIG. 3, reference numeral 40 represents an electrical connection structure; reference numeral 41 represents a current collector including a conductive resin layer; and reference numeral 42 represents a conductive member; reference numeral 43 represents an active material layer.

DESCRIPTION OF EMBODIMENTS

Figure 1:
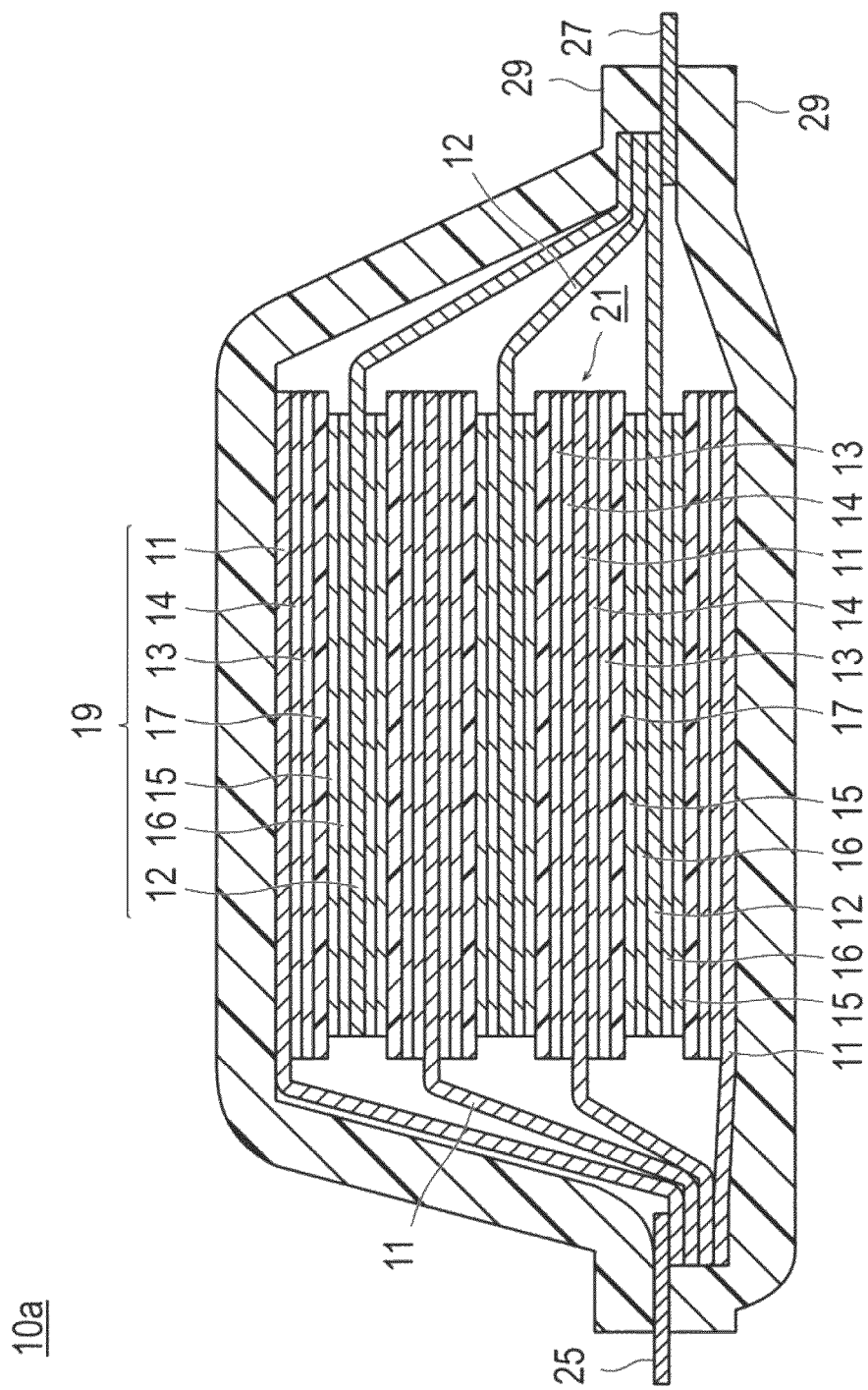
FIG. 1 is a schematic cross-sectional view illustrating a basic configuration of a flat type (laminate type) which is not a bipolar type, non-aqueous electrolyte lithium ion secondary battery, which is an embodiment of a lithium ion secondary battery.

According to an embodiment of the present invention, there is provided an electrical connection structure including a current collector which includes a conductive resin layer containing a polymer material and a conductive filler and a conductive member which is in electrical contact with the conductive filler. According to the above-described embodiment, the conductive filler in the conductive resin layer of the current collector and the conductive member provided on the current collector are in electrical contact with each other. Therefore, the contact resistance between the current collector including the conductive resin layer and a current collecting plate is reduced.

First, a lithium ion secondary battery suitably using the electrical connection structure according to an embodiment will be described, but is not limited only to the following embodiments. Incidentally, the same reference numerals are assigned to the same elements in the description of the drawings, and duplicate descriptions are omitted. In addition, the scale of the drawings includes some exaggeration for descriptive reasons, and may thus be different from the actual dimension.

A lithium ion secondary battery, which is a target of this embodiment, only needs to include an electrical connection structure to be described below, and the other constituent requirements should not be particularly limited.

For example, when the lithium ion secondary batteries are classified by the form and the structure, the electrical connection structure is applicable to every known form and structure of laminate type (flat type) batteries, winding type (barrel type) batteries, and the like. When the laminate type (flat type) battery structure is employed, long-term reliability is ensured by a sealing technique such as simple thermocompression. The laminate type (flat type) battery structure is advantageous in terms of cost and workability.

Further, when lithium ion secondary batteries are classified by the electrical connection manner (electrode structure), the electrical connection structure is applicable to both non-bipolar type (inner parallel connection type) batteries and bipolar type (inner serial connection type) batteries.

When lithium ion secondary batteries are classified by the type of electrolyte layers thereof, the electrical connection structure is applicable to any batteries including conventionally-known types of electrolyte layers, such as liquid electrolyte type batteries whose electrolyte layers are composed of a liquid electrolyte such as a non-aqueous electrolyte solution and polymer batteries whose electrolyte layers are composed of a polymer electrolyte. The polymer batteries are further classified into gel electrolyte batteries employing a polymer gel electrolyte (also simply referred to as a gel electrolyte) and solid polymer (all-solid-state) batteries employing a polymer solid electrolyte (also simply referred to as polymer electrolyte).

FIG. 1 is a schematic cross-sectional view illustrating a basic configuration of a non-aqueous electrolyte lithium ion secondary battery which is a flat type (laminate type) and not a bipolar type (hereinafter, also simply referred to as the "laminate type battery"). As illustrated in FIG. 1, a laminate type battery 10a of this embodiment has a structure in which a power generating element 21 with a substantially rectangular shape, in which a charge and discharge reaction actually occurs, is sealed inside of a battery outer casing material 29 serving as an outer casing body. Herein, the power generating element 21 has a configuration in which a positive electrode, an electrolyte layer 17, and a negative electrode are laminated. The positive electrode has a configuration in which a positive conductive member 14 and a positive electrode active material layer 13 are disposed in this order on both surfaces of a positive electrode current collector 11. The negative electrode has a configuration in which a negative conductive member 16 and a negative electrode active material layer 15 are disposed in this order on both surfaces of a negative electrode current collector 12. Specifically, one positive electrode conductive member 14 and positive electrode active material layer 13, and the negative electrode active material layer 15 and negative electrode conductive member 16 adjacent thereto are disposed to face each other via the electrolyte layer 17, and the negative electrode, the electrolyte layer, and the positive electrode are laminated in this order. Accordingly, the positive electrode, the electrolyte layer, and the negative electrode adjacent to each other constitute one single battery layer 19. Therefore, it can be said that, when a plurality of the single battery layers 19 are laminated, the laminate type battery 10a illustrated in FIG. 1 has a configuration in which electrically parallel connection is made among them.

Incidentally, on the outermost layer positive electrode current collector which is located on both outermost layers of the power generating element 21, the positive electrode active material layer 13 is disposed only on one surface. However, an active material layer may be provided on both surfaces. That is, not only a current collector exclusive for an outermost layer in which an active material layer is provided only on one surface can be achieved but also a current collector having an active material layer on both surfaces can be directly used as a current collector of an outermost layer. Further, by reversing the arrangement of the positive electrode and the negative electrode of FIG. 1, it is also possible that the outermost layer negative electrode current collector is located on both outermost layers of the power generating element 21 and a negative electrode active material layer is disposed on one surface or both surfaces of the same outermost layer negative electrode current collector.

The positive electrode current collector 11 and negative electrode current collector 12 have a structure in which each of the positive electrode current collecting plate 25 and negative electrode current collecting plate 27, which conductively communicate with each electrode (positive electrode and negative electrode), is attached and inserted to a terminal of the battery outer casing material 29 so as to be led to the outside of the battery outer casing material 29. The positive electrode current collecting plate 25 and the negative electrode current collecting plate 27 may be attached by, for example, ultrasonic welding or resistance welding, to the positive electrode current collector 11 and the negative electrode current collector 12 of the respective electrodes via positive electrode leads and negative electrode leads (not illustrated) as necessary.

Incidentally, in FIG. 1, the conductive member is disposed on both surfaces of the current collector; however, the present invention is not limited to the above-described embodiment and the conductive member may be disposed to at least one surface of the current collector. Preferably, the conductive member is disposed to (formed on) both surfaces of the current collector. That is, it is preferable that (i) the positive electrode conductive member 14 and the positive electrode active material layer 13 be formed on both surfaces of the current collector 11 in this order and/or (ii) the negative electrode conductive member 16 and the negative electrode active material layer 15 be formed on both surfaces of the current collector 11 in this order. Further, in FIG. 1, the conductive member is provided to all of the current collectors; however, the present invention is not limited to the above-described embodiment. That is, when the laminate type battery includes a plurality of single battery layers (current collectors), the conductive member may be disposed to at least one of the current collectors, but preferably, the conductive member is disposed to all of the current collectors.

Figure 2:
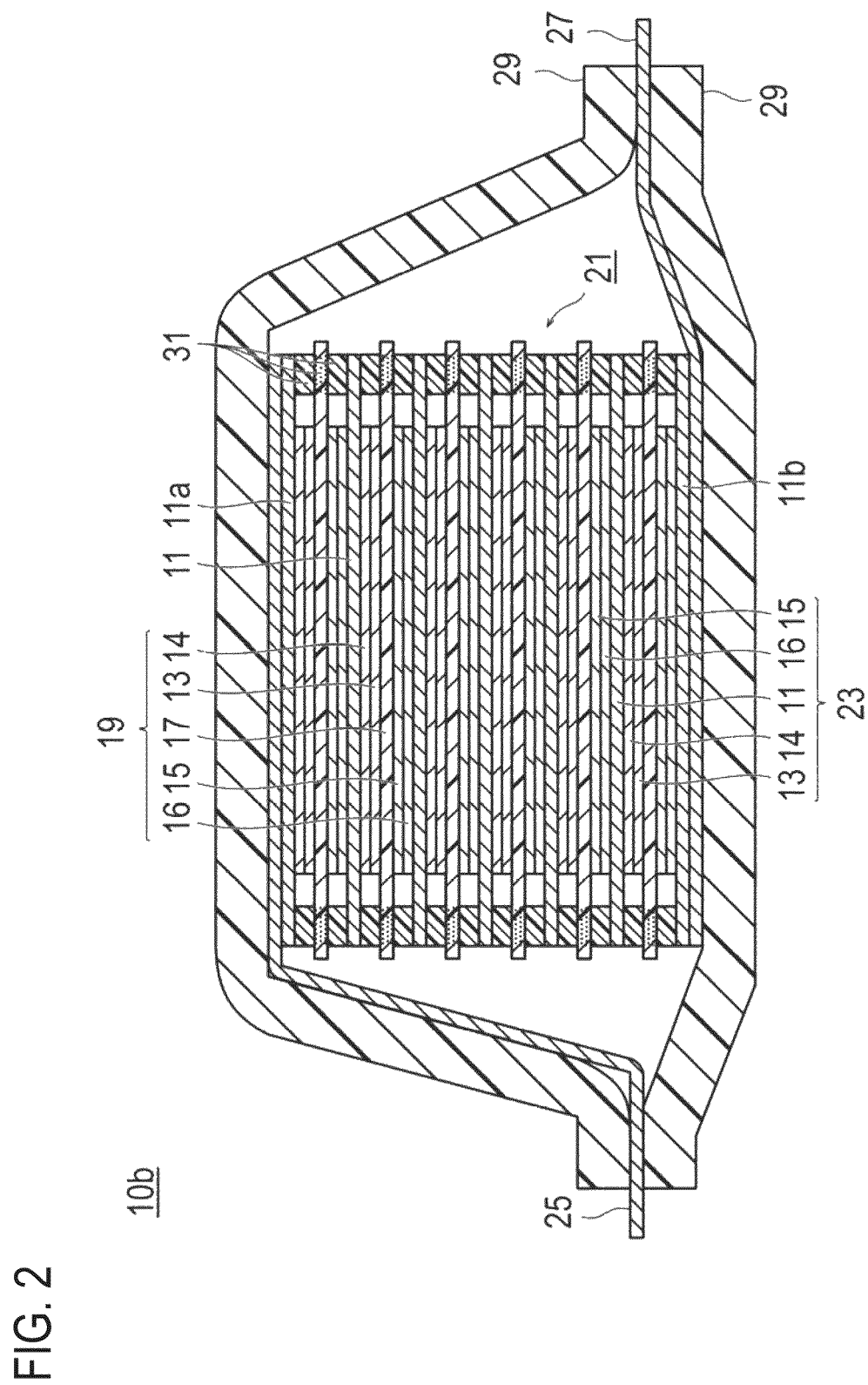
FIG. 2 is a schematic cross-sectional view illustrating a basic configuration of a bipolar type lithium ion secondary battery which is another embodiment of the lithium ion secondary battery.

FIG. 2 is a schematic cross-sectional view schematically illustrating a basic configuration of a bipolar type non-aqueous electrolyte lithium ion secondary battery (hereinafter, also simply referred to as the "bipolar type battery") 10b. The bipolar type battery 10b illustrated in FIG. 2 has a structure in which the power generating element 21 with a substantially rectangular shape, in which a charge and discharge reaction actually occurs, is sealed in the inside of a laminate film 29 serving as a battery outer casing material.

As illustrated in FIG. 2, the power generating element 21 of the bipolar type battery 10b includes a plurality of bipolar type electrodes 23 each of which has the positive electrode conductive member 14 and the positive electrode active material layer 13 formed in this order on one surface of the current collector 11 to be electrically connected thereto and the negative electrode conductive member 16 and the negative electrode active material layer 15 formed in this order on the other surface of the current collector 11 to be electrically connected thereto. Each of the bipolar type electrodes 23 is laminated via the electrolyte layer 17 to form the power generating element 21. Incidentally, the electrolyte layer 17 has a configuration in which an electrolyte is held at the center portion in the plane direction of a separator serving as abase material. At this time, each of the bipolar type electrodes 23 and each of the electrolyte layers 17 are alternately laminated such that the positive electrode conductive member 14 and the positive electrode active material layer 13 of one bipolar type electrode 23 face the negative electrode conductive member 16 and the negative electrode active material layer 15 of another bipolar type electrode 23 adjacent to the one bipolar type electrode 23 via the electrolyte layer 17. That is, the electrolyte layer 17 is disposed to be interposed between the positive electrode active material layer 13 and the positive electrode conductive member 14 of one bipolar type electrode 23 and the negative electrode active material layer 15 and the negative electrode conductive member 16 of another bipolar type electrode 23 adjacent to the one bipolar type electrode 23.

The positive electrode active material layer 13, the positive electrode conductive member 14, the electrolyte layer 17, the negative electrode active material layer 15 and the negative electrode conductive member 16 adjacent to each other constitute one single battery layer 19. Therefore, it can also be said that the bipolar type battery 10b has a configuration in which the single battery layers 19 are laminated. Further, for the purpose of preventing liquid junction caused by leakage of the electrolyte solution from the electrolyte layer 17, a sealing portion (insulation layer) 31 is provided at the outer periphery of each of the single battery layer 19. Incidentally, only one surface of an outermost layer current collector of the positive electrode side 11a located at the outermost layer of the power generating element 21 is provided with the positive electrode active material layer 13.

Further, only one surface of an outermost layer current collector of the negative electrode side 11b located at the outermost layer of the power generating element 21 is provided with the negative electrode active material layer 15.

Further, in the bipolar type battery 10b illustrated in FIG. 2, the positive electrode current collecting plate 25 is disposed to be adjacent to the outermost layer current collector of the positive electrode side 11a and extends to be exposed on the outside of the laminate film 29 serving as a battery outer casing material. On the other hand, the negative electrode current collecting plate 27 is disposed to be adjacent to the outermost layer current collector of the negative electrode side 11b and similarly extends to be exposed on the outside of the laminate film 29 serving as a battery outer casing.

In the bipolar type battery 10b illustrated in FIG. 2, generally, the sealing portion 31 is provided at the periphery of each of the single battery layers 19. This sealing portion 31 is provided in order to prevent the contact between the current collectors 11 adjacent to each other inside the battery or occurrence of a short circuit caused by slight unevenness at the end portion of the single battery layer 19 in the power generating element 21. By providing such sealing portions 31, it is possible to ensure long-term reliability and safety and to provide the bipolar type battery 10b with high quality.

Incidentally, the number of the single battery layers 19 laminated is adjusted depending on a desired voltage. Further, the number of the single battery layers 19 laminated in the bipolar type battery 10b may be lowered as long as sufficient output can be ensured. Also for the bipolar type battery 10b, there is a need to prevent external damage at the time of operation and avoid environmental worsening. Therefore, the bipolar type battery 10b preferably has a structure in which the power generating element 21 is sealed in the laminate film 29, which is a battery outer casing material, under reduced pressure, and the positive electrode current collecting plate 25 and the negative electrode current collecting plate 27 are exposed on the outside of the laminate film 29.

Incidentally, in FIG. 2, the conductive member is disposed on both surfaces of the current collector; however, the present invention is not limited to the above-described embodiment and the conductive member may be disposed to at least one of the current collectors. Preferably, the conductive member is disposed to (formed on) both surfaces of the current collector. That is, it is preferable that the positive electrode conductive member 14 and the positive electrode active material layer 13 be formed on one surface of the current collector 11 in this order and the negative electrode conductive member 16 and the negative electrode active material layer 15 be formed on the other surface thereof in this order. Further, in FIG. 2, the conductive member is provided to all of the current collectors; however, the present invention is not limited to the above-described embodiment. That is, when the laminate type battery includes a plurality of single battery layers (current collectors), the conductive member may be disposed to at least one of the current collectors, but preferably, the conductive member is disposed to all of the current collectors.

Figure 3:
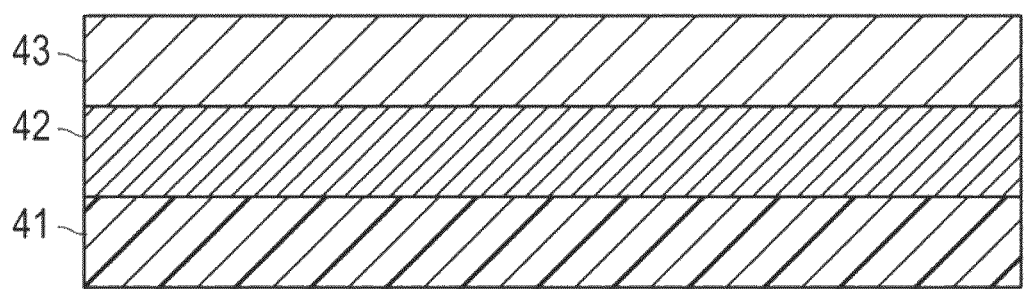
FIG. 3 is a schematic cross-sectional view illustrating an embodiment of an electrical connection structure.

FIG. 3 is a schematic cross-sectional view illustrating an embodiment of an electrode. An electrode 40 illustrated in FIG. 3 includes a current collector 41 including a conductive resin layer, a conductive member 42 formed on the surface of the current collector 41, and an active material layer 43 formed on the surface of the conductive member 42. Incidentally, in the present specification, unless otherwise stated, the positive and negative electrode current collectors are collectively referred to as the "current collector," the positive and negative electrode conductive members are collectively referred to as the "conductive member," and the positive and negative electrode active material layers are collectively referred to as the "active material layer." For this reason, for example, the "current collector" means any of the positive electrode current collector, the negative electrode current collector, and the positive and negative electrode current collectors.

Figure 4:
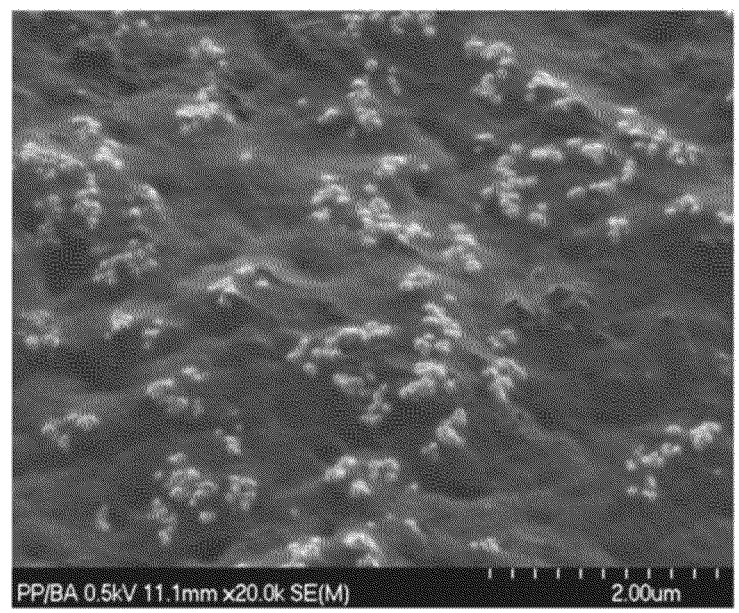
FIG. 4 is a scanning electron microscope (SEM) photograph obtained by observing the surface of a current collector which includes a conductive resin layer comprised of polypropylene containing 20% by mass of acetylene black, from the upper 45° direction.
Figure 5:
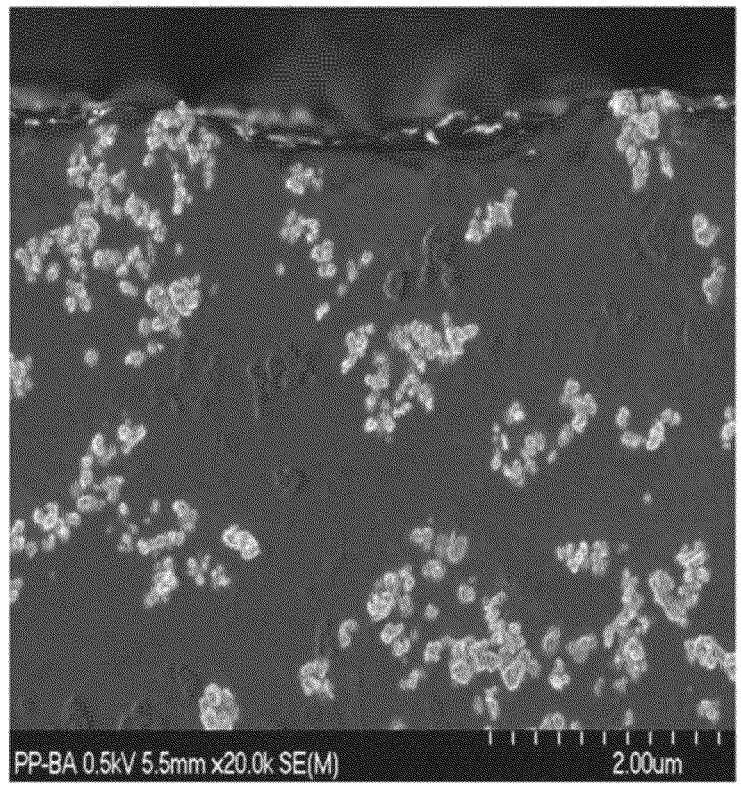
FIG. 5 is a photograph obtained by observing the cross-section of the current collector illustrated in FIG. 4 with a SEM.

For the purpose of improving an output density per weight of a secondary battery, Patent Literature 1 proposes to use a current collector containing a polymer material and a conductive filler. However, it is found that the output performance of the secondary battery using this current collector is not sufficient. In this regard, the present inventors specifically investigated this problem, and as a result, they estimated that a high contact resistance between the current collector containing a polymer material and a conductive filler and the current collecting plate mainly comprised of a metal is one of the causes of this problem. For this reason, the present inventors focused on the electrical contact between the current collector and the current collecting plate. FIG. 4 is a scanning electron microscope (SEM) photograph obtained by observing the surface of a current collector which includes a conductive resin layer comprised of polypropylene containing 20% by mass of acetylene black serving as a conductive filler, from the upper 45° direction. In FIG. 4, those observed as white are acetylene black and those observed as black are polypropylene. As seen from FIG. 4, unevenness with a size of about 1 μm is present on the surface of the current collector, and acetylene black is exposed at parts of the unevenness. FIG. 5 is a photograph obtained by observing the cross-section of the same current collector in the same manner with a SEM, and it is found that a lot of acetylene black is present inside the current collector and a proportion of acetylene black exposed on the surface is small. From this observation result, the present inventors estimated that since the current collector including a conductive resin layer and the current collecting plate mainly comprised of a metal are partially in point contact with each other and thus sufficient contact cannot be performed two-dimensionally and three-dimensionally, the electrical connection is difficult to achieve and the contact resistance may be increased. Further, the present inventors estimated that in the point contact, the electrical connection becomes unstable, for example, the current collector is separated from the active material layer by vibration, and there is a case where the performance of the battery cannot be maintained (durability is poor).

Figure 6:
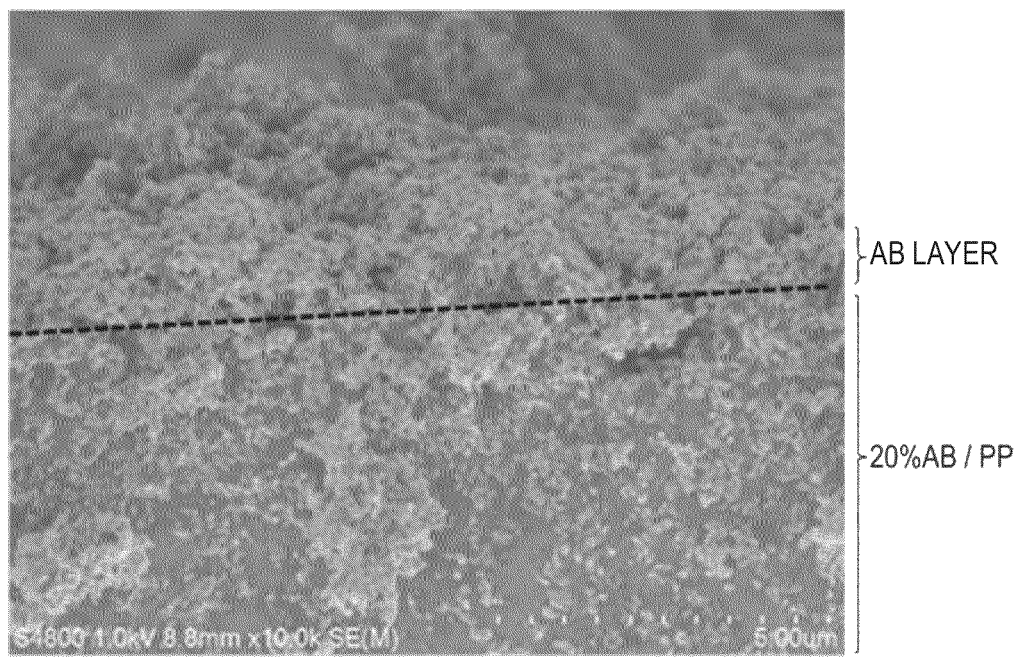
FIG. 6 is a cross-sectional SEM photograph showing an electrical connection structure in which an acetylene black layer is provided as a conductive member on the surface of the current collector which includes a conductive resin layer comprised of polypropylene containing 20% by mass of acetylene black.

In order to solve such a problem, the present inventions conducted intensive studies. As a result, it is found that when a current collector which includes a conductive resin layer containing a polymer material and a conductive filler is provided, and a conductive member electrically connected to the conductive filler is provided thereon, the contact resistance is reduced. FIG. 6 is a cross-sectional SEM photograph showing a part of the electrical connection structure in which an acetylene black layer is provided as a conductive member on the surface of the current collector which includes a conductive resin layer comprised of polypropylene containing 20% by mass of acetylene black. In the part of the electrical connection structure illustrated in FIG. 6, it is found that acetylene black (AB) in the conductive resin layer ("20% AB/PP" in FIG. 6) and the acetylene black layer ("AB layer" in FIG. 6) provided on the surface thereof are in close contact with each other. When such a conductive member is disposed between the current collector and the current collecting plate, two-dimensional and/or three-dimensional contact between the current collector which includes a conductive resin layer containing a polymer material and a conductive filler and the current collecting plate is increased and thus the contact resistance can be reduced. According to this, the output performance of the battery can be improved.

Incidentally, the above description is merely presumption, and the present invention is not limited to the above description.

Hereinafter, the electrical connection structure will be described in more detail.

[Current Collector Including Conductive Resin Layer]

The electrical connection structure includes a current collector which includes a conductive resin layer containing a polymer material and a conductive filler. The polymer material may be a conductive polymer or a polymer having no conductivity. In addition, the polymer can be used alone or can be used as a mixture of two or more kinds thereof. Further, the polymer may be a commercially available product or a synthesis product.

The conductive polymer is selected from materials that have conductivity but do not allow conduction of ions used as a charge transfer medium. It is considered that these conductive polymers show conductivity by the formation of an energy band with a conjugated polyene system thereof. As a typical example, a polyene-based conductive polymer that has been proceeding toward practical use in an electrolytic condenser or the like can be used. Specific examples thereof include polyaniline, polypyrrole, polythiophene, polyacetylene, polyparaphenylene, polyphenylene vinylene, polyacrylonitrile, polyoxadiazole, and mixtures thereof. From the viewpoint of electron conductivity and stable use in a battery, polyaniline, polypyrrole, polythiophene, and polyacetylene are more preferable.

Examples of the polymer material having no conductivity include polyethylene (PE) (high-density polyethylene (HDPE), low-density polyethylene (LDPE), or the like), polypropylene (PP), polystyrene (PS), polyethylene terephthalate (PET), polyether nitrile (PEN), polyimide (PI), polyamide (PA), polyamide imide (PAI), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), polyvinylidene chloride (PVDC), and mixtures thereof. These materials have a very large potential window to be stable to either of positive and negative potentials and save weight for improvement in battery output density. Among them, from the viewpoint of durability with respect to the electrolyte solution to be used, various polyolefins, such as polypropylene and polyethylene, or a copolymer and mixture thereof are preferable.

The conductive filler to be used is selected from materials having conductivity. Preferably, from the viewpoint of suppressing the ion transmission in the conductive resin layer, a material having no conductivity with respect to ions used as a charge transfer medium is preferably used.

Specifically, a carbon material, aluminum, gold, silver, copper, iron, platinum, chromium, tin, indium, antimony, titanium, nickel, and the like are exemplified, but the materials are not limited thereto. These conductive fillers may be used alone or in combination of two or more kinds thereof. Further, alloy materials thereof such as stainless steel (SUS) may be used. From the viewpoint of corrosion resistance, aluminum, stainless steel, a carbon material, or nickel is preferable, and a carbon material or nickel is more preferable. Furthermore, these conductive fillers may be in the form of a particulate ceramic material or resin material coated therearound with a metal described above by plating or the like.

Examples of the carbon material include at least one selected from the group consisting of acetylene black, carbon black, Vulcan (registered trademark), Black Pearls (registered trademark), carbon nanofiber, Ketjen black (registered trademark), carbon nanotube, carbon nanohorn, carbon nanoballoon, hard carbon, and fullerene. These carbon materials have a very large potential window to be stable to a wide range of positive and negative potentials and are excellent in conductivity. Further, since the carbon materials are very lightweight, mass increase is minimized. Moreover, the carbon materials are often also used as a conductive aid for an electrode, and thus even when the carbon materials are brought into contact with the conductive aid, the carbon materials exhibit very low contact resistance due to the use of the same carbon material. Incidentally, when the carbon material is used as a conductive filler, it is feasible to subject the surface of the carbon material to hydrophobic treatment so as to decrease the compatibility of the electrolyte to the current collector and thereby make it unlikely that the electrolyte will penetrate into pores of the current collector.

Incidentally, when the charge-discharge potential of the negative electrode active material is close to the deposition potential of Li, insertion of Li occurs in the conductive filler such as carbon material by charging and discharging and thus the conductive filler is expanded. For this reason, there is a risk that the current collector may be damaged (damages are caused to the current collector). Therefore, for the conductive filler of the current collector facing the negative electrode, a material which does not cause lithiation, such as Ni, Cu, Fe, or SUS, is preferable. In addition, a conductive filler whose surface is coated with these materials can be also preferably used.

The shape of the conductive filler is not particularly limited, and a conventionally-known shape such as a granular shape, a powder shape, a fiber-like shape, a plate-like shape, a lump shape, a cloth shape, or a mesh-like shape can be selected appropriately. For example, when conductivity is intended to be provided in a wide range, a conductive filler having a granular shape is preferably used. On the other hand, when conductivity is intended to be further improved in a specific direction, a conductive filler having a shape with a certain directionality such as a fiber-like shape is preferably used.

The average particle diameter of the conductive filler is not particularly limited, but is preferably about 0.01 to 10 μm, more preferably 0.01 to 3 μm, and further preferably about 0.01 to 1 vim. Incidentally, in the present specification, the "particle diameter" means the greatest length L between any two points on the circumference of the conductive filler. For a value of the "average particle diameter", a value is employed which is calculated with an observation means, such as a scanning electron microscope (SEM) or a transmission electron microscope (TEM), as an average value of particle diameters of the particles observed in several to several tens of fields of view.

When the conductive filler has a fiber-like shape, the average fiber length thereof is not particularly limited, but is preferably 0.1 to 100 μm. Incidentally, in the present specification, for the average fiber length, a value is employed which is calculated with an observation means, such as a scanning electron microscope (SEM) or a transmission electron microscope (TEM), as an average value of fiber lengths of the fibers observed in several to several tens of fields of view. Further, when the conductive filler has a fiber-like shape, the average diameter thereof is also not particularly limited, but is preferably 0.01 to 10 μm, more preferably 0.01 to 3 μm, and further preferably 0.01 to 1 μm.

The content of the polymer material in the conductive resin layer is not particularly limited, but is preferably 10 to 95 parts by mass and more preferably 12 to 90 parts by mass when the total amount of the polymer material and the conductive filler in the conductive resin layer is considered as 100 parts by mass.

Further, the content of the conductive filler in the conductive resin layer is also not particularly limited. However, the content of the conductive filler is preferably 5 to 90 parts by mass and more preferably 10 to 88 parts by mass when the total amount of the polymer material and the conductive filler in the conductive resin layer is considered as 100 parts by mass. When such an amount of the conductive filler is added to the polymer material, sufficient conductivity can be provided to the current collector while an increase in mass of the current collector is suppressed.

In the conductive resin layer, other additives may be contained in addition to the polymer material and the conductive filler. Examples of the other additives include carboxylic acid-modified polypropylene such as maleic anhydride modified polypropylene. The added amount of the other additives is not particularly limited, but is preferably 1 to 25 parts by mass with respect to total 100 parts by mass of the polymer material and the conductive filler.

The thickness of the current collector including a conductive resin layer is preferably 1 to 200 μm, more preferably 3 to 150 μm, and further preferably 5 to 100 μm.

The method for producing a current collector including a conductive resin layer is not particularly limited, and for example, a method is mentioned in which each component of a polymer material, a conductive filler, and as necessary, an additive is melted and kneaded by an extruder or the like and the melted-and-kneaded material is subjected to rolling by a heat pressing device.

Incidentally, the current collector (the conductive resin layer) may have a single layer structure or a laminate structure obtained by appropriately combining layers formed from these materials. Alternatively, the current collector may have another layer in addition to the conductive resin layer. As another layer, for example, from the viewpoint of lightness of the current collector, there are mentioned a conductive resin layer formed from a resin having conductivity or a metal layer. The former is preferable from the viewpoint of lightness of the current collector. In addition, the latter is preferable from the viewpoint of blocking the movement of lithium ions between the single battery layers.

[Conductive Member]

The electrode includes a conductive member which is in electrical contact with the conductive filler contained in the conductive resin layer of the current collector. The conductive member is disposed between the current collector and the active material layer. With the configuration, the conductive member can be electrically connected to the current collector efficiently and stably, and thus it is possible to reduce the contact resistance and improve the durability.

The material of the conductive member is not particularly limited, but it is preferable to contain at least one conductive material selected from the group consisting of at least one metal selected from the group consisting of a metal which has an ionization tendency lower than that of iron, iron, titanium, zirconium, tantalum, and niobium, an alloy having the metal as a main component, and a conductive carbon.

The reason for this is that these materials are less likely to form an oxide film having insulating properties on the surface thereof and the electrical contact with the conductive filler is maintained over a long time.

More specifically, specific examples of the metal which has anionization tendency lower than that of iron include cobalt, nickel, tin, antimony, copper, silver, palladium, iridium, platinum, and gold. Since the metal which has an ionization tendency lower than that of iron has small resistance even when the oxide film is formed, the contact resistance between the current collector and the current collecting plate can be reduced. Examples of the alloy include stainless steel (SUS).

Further, specific examples of the conductive carbon include at least one selected from the group consisting of acetylene black, carbon black, Vulcan (registered trademark), Black Pearls (registered trademark), carbon nanofiber, Ketjen black (registered trademark), carbon nanotube, carbon nanohorn, carbon nanoballoon, hard carbon, and fullerene.

Herein, it is preferable that the material of the conductive member be appropriately selected depending on the positive electrode and the negative electrode. For example, when the conductive member is a positive electrode conductive member, the material of the conductive member is preferably at least one selected from the group consisting of conductive carbon, titanium, and stainless steel. That is, it is preferable that the active material layer be a positive electrode active material layer and the conductive member contain at least one conductive material selected from the group consisting of conductive carbon, titanium, and stainless steel. Since these materials are excellent in corrosion resistance (oxidation resistance), the durability of the electrode can be further improved. In addition, for example, when the conductive member is a negative electrode conductive member, the material of the conductive member is preferably at least one selected from the group consisting of nickel, copper, iron, and stainless steel. That is, it is preferable that the active material layer be a negative electrode active material layer and the conductive member contain at least one conductive material selected from the group consisting of nickel, copper, iron, and stainless steel. These materials can prevent deterioration caused by $Li^+$ insertion/removal or alloying with Li.

The conductive material may be used alone or may be used as a mixture of two or more kinds thereof.

The shape of the conductive material is not particularly limited, and a conventionally-known shape such as a granular shape, a powder shape, a fiber-like shape, a plate-like shape, a lump shape, a cloth shape, or a mesh-like shape can be selected appropriately.

The average particle diameter (the average particle diameter of the primary particles) of the material of the conductive member is not particularly limited, but is preferably about 0.01 to 10 μm, more preferably about 0.01 to 3 μm, and further preferably about 0.01 to 1 μm. With such a size, the conductive material can effectively contact the unevenness on the surface of the current collector. Therefore, the electrical contact between the current collector and the conductive member can be further increased. Incidentally, in the present specification, the "particle diameter" means the greatest length L between any two points on the circumference of the conductive material. For a value of the "average particle diameter", a value is employed which is calculated with an observation means, such as a scanning electron microscope (SEM) or a transmission electron microscope (TEM), as an average value of particle diameters of the particles observed in several to several tens of fields of view. Incidentally, in Examples, the size of the material of the conductive member is described as the standard particle diameter range of the primary particles, but the standard particle diameter range is preferably included in the above average particle diameter range.

When the conductive material has a fiber-like shape, the average fiber length thereof is not particularly limited, but is preferably 0.1 to 100 μm. Incidentally, in the present specification, for the average fiber length, a value is employed which is calculated with an observation means, such as a scanning electron microscope (SEM) or a transmission electron microscope (TEM), as an average value of fiber lengths of the particles observed in several to several tens of fields of view. Further, when the conductive material has a fiber-like shape, the average diameter thereof is also not particularly limited, but is preferably 0.01 to 10 μm, more preferably 0.01 to 3 μm, and further preferably 0.01 to 1 μm. With such a size, the conductive material can effectively contact the unevenness on the surface of the current collector. Therefore, the electrical contact between the current collector and the conductive member can be further increased. Furthermore, when the conductive material has a fiber-like shape, the two-dimensional (horizontal) electrical contact can be increased only by adding a small amount of the conductive material, which is preferable.

The conductive member may be formed only from the above-described conductive material or may contain other materials as described below. In any cases, the content of the conductive material in the conductive member is preferably larger than the content of the conductive filler in the conductive resin layer. That is, the conductive member preferably contains a larger amount of the conductive material than the content of the conductive filler in the conductive resin layer. With such a configuration, the durability, particularly, the charge-discharge cycle durability of the electrode can be further improved.

Further, the conductive member may contain a polymer material in addition to the above-described conductive material. Examples of the polymer material usable in the conductive member include a conductive polymer such as polyaniline, polypyrrole, polythiophene, polyacetylene, polyparaphenylene, polyphenylene vinylene, polyacrylonitrile, or polyoxadiazole; a thermoplastic polymer having no conductivity such as polyethylene (high-density polyethylene (HDPE), low-density polyethylene (LDPE), or the like), polypropylene, polystyrene, polyethylene terephthalate, polyether nitrile, polyimide, polyamide, polyamide imide, polytetrafluoroethylene, styrene-butadiene rubber, polyacrylonitrile, polymethyl acrylate, polymethylmethacrylate, polyvinyl chloride, polyvinylidene fluoride, or polyvinylidene chloride; and a thermosetting polymer having no conductivity such as an epoxy resin or an unsaturated polyester resin. These may be used alone or may be used as a mixture of two or more kinds thereof.

When the conductive member contains a conductive material and a polymer material, the content of the conductive material is preferably 20 to 95% by mass and more preferably 50 to 90% by mass with respect to the total mass of the conductive member. The content of the conductive material in the conductive member is preferably more than the content of the conductive filler in the conductive resin layer. With such a configuration, the contact resistance can be further reduced.

The conductive member is provided on the current collector; however, regarding the shape in the plane direction thereof, the conductive member may be provided on the entire surface of the current collector or may be provided only at an area necessary for performing electrical contact with the conductive filler contained in the conductive resin layer. In addition, the conductive member may be continuously provided in the plane direction or may be partially or intermittently provided. Examples of the shape thereof include various shapes such as a mesh shape, a stripe shape, a lattice shape, a dot shape, and a band shape. Further, the conductive member is preferably provided on at least a surface, which is in contact with the current collecting plate, of the current collector, but may be provided on both surfaces of the current collector.

The thickness of the conductive member is preferably 0.01 to 60 µm and more preferably 0.1 to 30 µm.

It is preferable that the electrical connection structure is obtained by applying an ink containing a conductive material and a solvent to a current collector to form a coating film, thereby forming a conductive member on the current collector. In addition, heat pressing may be further performed on the conductive member formed on the current collector. That is, the electrical connection structure may be obtained by applying an ink containing a conductive material and a solvent to a current collector to form a coating film, thereby forming a conductive member on the current collector, and then performing heat pressing on the conductive member. When the conductive member obtained by applying an ink containing a conductive material and a solvent contains a thermosetting polymer, the ink may contain a precursor of the thermosetting polymer (a non-crosslinked polymer having a crosslinking point, a crosslinking agent, and the like). Further, for the electrical connection structure, it is also preferable that the electrical connection structure is obtained by applying an ink containing a conductive material to a suitable base material (for example, a polyimide film) to form a coating film that is a conductive member, laminating the coating film and the current collector, then forming the coating film (the conductive member) to be integrated with the upper portion of the current collector by heat pressing, and removing the base material from the conductive member. With such a structure, the conductive filler in the conductive resin layer and the conductive member is more easily in contact with each other, and thus the contact resistance is further reduced.

Furthermore, it is preferable to have a structure in which at least a part of the conductive member gets into the surface of the conductive resin layer of the current collector, that is, a structure in which at least a part of the conductive member is buried into the inside from the surface of the conductive resin layer of the current collector or a structure in which at least a part of the conductive member extends beyond the surface of the conductive resin of the current collector and is present inside the conductive resin layer. With such a structure, the conductive filler in the conductive resin layer and the conductive member is more easily in contact with each other, and thus the contact resistance is further reduced.

Further, it is also preferable that the electrical connection structure be obtained by pasting the conductive member and the current collector to each other by a conductive adhesive member. When the conductive member and the current collector are pasted to each other by the conductive adhesive member, the in-plane variation of the contact resistance is reduced. Moreover, when the conductive member has a laminate structure of two or more layers, at least two layers of the conductive member are preferably pasted to each other by a conductive adhesive member. With such a structure, the in-plane variation of the contact resistance can be reduced. Incidentally, these conductive adhesive members to be used for the electrode will be described in the following section of the method for producing an electrode.

Further, hereinafter, a preferred embodiment of the configuration other than the electrode when the electrode of the present invention is used in a lithium ion secondary battery will be described; however, the present invention has a feature in terms of the electrode and the configuration other than the electrode is the same as in a known configuration or a configuration with appropriate modification can be employed.

(Active Material Layer)

The active material layer contains an active material. Herein, the active material absorbs and releases ions during charge and discharge and generates electric energy. In the active material, there are a positive electrode active material having a constitution to absorb ions during discharge and release the ions during charge and a negative electrode active material having a constitution to release ions during discharge and absorb the ions during charge. The active material layer of this embodiment functions a positive electrode active material layer when the positive electrode active material is used as the active material; on the other hand, the active material layer of this embodiment functions a negative electrode active material layer when the negative electrode active material is used. In the present specification, matters common to the positive electrode active material and the negative electrode active material will be described simply as the "active material."

Examples of the positive electrode active material include $LiMn_2O_4$, $LiCoO_2$, $LiNiO_2$, $Li(Ni-Mn-Co)O_2$, and lithium-transition metal composite oxide, such as a compound in which a part of these transition metals is replaced with another element, a lithium-transition metal phosphate compound, and a lithium-transition metal sulfate compound. In some cases, two or more kinds of the positive electrode active material may be concurrently used. From the viewpoint of capacity and output characteristics, lithium-transition metal composite oxide is preferably used as the positive electrode active material. A composite oxide containing lithium and nickel is more preferably used, and $Li(Ni-Mn-Co)O_2$ and a composite oxide in which a part of these transition metals is replaced with another element (hereinafter, simply referred to as "NMC composite oxide") is further preferably used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M. Therefore, extractable Li amount is twice the amount of spinel lithium manganese oxide, that is, as the supply power is two times higher, it can have high capacity.

As described above, the NMC composite oxide also includes a composite oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1) be satisfied. Incidentally, the composition of each element can be measured by induction coupled plasma (ICP) spectroscopy.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of the cycle characteristics, a part of transition element is preferably replaced with another metal element, and particularly, it is preferable that $0 < x \leq 0.3$ in General Formula (1) be satisfied. The crystal structure is stabilized by solid-dissolving at least one selected from the group consisting of Ti, Zr, Nb, W, P, Al, Mg, V, Ca, Sr, and Cr, and as a result, a decrease in capacity of the battery can be prevented even when charging and discharging are repeated. Thus, it is considered that excellent cycle characteristics can be realized.

As a more preferred embodiment, from the viewpoint of improving a balance between capacity and lifetime characteristics, it is preferable that b, c, and d in General Formula (1) be $0.49 \leq b \leq 0.51$, $0.29 \leq c \leq 0.31$, and $0.19 \leq d \leq 0.21$. For example, as compared with $LiCoO_2$, $LiMn_2O_4$, $LiNi_{1/3}Mn_{1/3}Co_{1/3}O_2$, and the like that exhibit actual performance in a general consumer use battery, $LiNi_{0.5}Mn_{0.3}Co_{0.2}O_2$ has a large capacity per unit mass. In addition, there is an advantage that a compact battery having a high capacity can be produced since the energy density can be improved, and thus, also from the viewpoint of a cruising distance, $LiNi_{0.5}Mn_{0.3}Co_{0.2}O_2$ is preferable. Incidentally, in terms of having a larger capacity, $LiNi_{0.8}Co_{0.1}Al_{0.1}O_2$ is more advantageous, but may have a problem in lifetime characteristics. On the other hand, $LiNi_{0.5}Mn_{0.3}Co_{0.2}O_2$ has lifetime characteristics as excellent as $LiNi_{1/3}Mn_{1/3}CO_{1/3}O_2$.

Meanwhile, preferred examples of the negative electrode active material include a metal such as Si or Sn, a metal oxide such as TiO, $Ti_2O_3$, and $TiO_2$, or $SiO_2$, SiO, and $SnO_2$, a composite oxide of lithium and transition metal such as $Li_{4/3}Ti_{5/3}O_4$ or $Li_7MnN$, a Li—Pb alloy, a Li—Al alloy, Li, and a carbon material such as graphite (natural graphite, artificial graphite), carbon black, activated carbon, carbon fiber, coke, soft carbon, or hard carbon. Further, the negative electrode active material preferably contains an element to be alloyed with lithium. By using the element to be alloyed with lithium, a battery having high energy density, high capacity, and excellent output characteristics can be obtained as compared to the case of using carbon material. These negative electrode active materials may be used alone or in combination of two or more kinds thereof.

When an active material other than the carbon material (hereinafter, referred to as "non-carbon active material") is used, a material with which the surface of the non-carbon active material is coated with a carbon material is preferably used as the active material. According to such an embodiment, the electron network is constructed between the active materials or between the active material and a conductive aid described below, and a conductive path in the electrode can be ensured even when an active material with large expansion or shrinkage is used. As a result, even when charging and discharging are repeated, an increase in resistance can be suppressed. More preferably, from the viewpoint of improving the energy density of the electrode, a material capable of alloying with lithium of high capacity is coated with a carbon material and then used as the active material. Regarding the amount of the carbon material coated in this case, an amount that enables the electrical contact between the active materials or between the active material and the conductive aid to be favorable may be used depending on the particle diameter of the non-carbon active material (particle). Preferably, the amount of the carbon material coated is adjusted to about 2 to 20% by mass with respect to the total mass of the coated active material. Incidentally, the term "coating" described in the present invention includes a form in which a carbon material is present in (attached to) a part of the surface of the active material as well as a form in which the entire surface of the active material is coated with a carbon material.

The average particle diameter of the active material is not particularly limited, but is preferably 1 to 100 μm and more preferably 1 to 20 μm from the viewpoint of higher capacity, reactivity, and cycle durability of the battery. When the average particle diameter is within such a range, the secondary battery can prevent an increase in internal resistance of the battery at the time of charging and discharging under high output conditions so as to extract a sufficient current. Incidentally, when the active material includes secondary particles, the average particle diameter of primary particles included in the secondary particles is desirably in a range of 10 nm to 1 μm, but the average particle diameter is not necessarily limited to this range in this embodiment. However, the active material is not required to be in the state of the secondary particles obtained by aggregation or clusterization, although it depends on the production method. Regarding the particle diameter of the active material and the particle diameter of the primary particles, a median diameter obtained by using a laser diffraction method can be used. Incidentally, the shape of the active material varies depending on the type or the production method, and examples thereof include a spherical shape (a powder shape), a plate-like shape, a needle-like shape, a column-like shape, and a rectangular shape. However, the shape is not limited to these and any shape can be used without any particular problem. Preferably, a shape capable of properly improving battery characteristics such as charge and discharge characteristics is selected as appropriate.

The active material layer of this embodiment further contains other additives such as a conductive aid, a binder, an electrolyte (for example, a polymer matrix, an ion conductive polymer, or an electrolyte liquid), and a lithium salt for enhancing ion conductivity, as necessary. However, the content of the material, which may function as the active material, in the active material layer is preferably 85 to 99.5% by mass.

The conductive aid means an additive which is blended in order to enhance the conductivity of the active material layer. Examples of the conductive aid include carbon materials such as carbon black including Ketjen black (registered trademark), acetylene black, and the like, graphite, and carbon fiber. When the active material layer contains a conductive aid, an electron network in the inside of the active material layer is effectively formed, and it can contribute to improvement of the output characteristics of a battery. Herein, the content of the conductive aid is not particularly limited as long as the conductivity of the active material layer can be improved up to a desired degree; however, the content thereof is preferably 0.5 to 15% by mass with respect to the total amount of the active material layer (in terms of a solid content), and more preferably 1 to 10% by mass.

The binder has the function of binding the active material, conductive aid, and the like to each other and maintaining the configuration or the electron network of the active material layer.

The material which may be used as the binder is not particularly limited, but when a binder is used in the active material layer including the negative electrode active material, an aqueous binder is preferably included. The aqueous binder has a high binding property, and has advantages of greatly suppressing an investment on facilities of a production line and lowering a burden on environment since water as a raw material is easily available and also only water vapor is generated during drying.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), polyethylene glycol, a copolymer of (meth)acrylamide and/or (meth)acrylic acid salt [a (meth)acrylamide polymer, a (meth)acrylamide-(meth) acrylic acid salt copolymer, an alkyl (carbon atom number of 1 to 4) (meth)acrylate-(meth)acrylic acid salt copolymer, or the like], a styrene-maleic acid salt copolymer, a mannich modified product of polyacrylamide, a formalin condensation type resin (a urea-formalin resin, a melamin-formalin resin, or the like), a polyamidepolyamine or dialkylamine-epichlorohydrin copolymer, polyethyleneimine, casein, soybean protein, synthetic protein, and a water soluble polymer such as galactomannan derivatives. These aqueous binders may be used alone or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property.

Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. The mass content ratio of the styrene-butadiene rubber to the water soluble polymer is not particularly limited, but the styrene-butadiene rubber: the water soluble polymer is preferably 1:0.1 to 10, and more preferably 1:0.5 to 2.

The content of the aqueous binder is preferably 80 to 100% by mass, more preferably 90 to 100% by mass, and further preferably 100% by mass with respect to the total amount of the binder.

Further, a binder material other than the aqueous binder is not particularly limited, and examples thereof include a thermoplastic polymer such as polyethylene, polypropylene, polyethylene terephthalate (PET), polyether nitrile (PEN), polyacrylonitrile, polyimide, polyamide, polyamide imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen additive thereof, or a styrene-isoprene-styrene block copolymer and a hydrogen additive thereof; a fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), or polyvinyl fluoride (PVF); a vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), or vinylidene fluoride-chlorotrifluoroethylene-based fluorine rubber (VDF-CTFE-based fluorine rubber); and an epoxy resin. Among these, polyvinylidene fluoride, polyimide, styrene-butadiene rubber, carboxymethyl cellulose, polypropylene, polytetrafluoroethylene, polyacrylonitrile, polyamide, and polyamide imide are more preferable.

These preferred binders can be used in the active material layer since these binders are excellent in heat resistance, have a very wide potential window, and are stable with respect to both positive electrode potential and negative electrode potential. These binders may be used alone or in combination of two or more kinds thereof.

The content of the binder is not particularly limited as long as it is sufficient to bind the active material, but is preferably 0.5 to 15% by mass and more preferably 1 to 10% by mass with respect to the total amount (in terms of solid content) of the active material layer.

The thickness of the active material layer of this embodiment is not particularly limited, and although conventionally known finding on the battery can be referred to, the thickness thereof is preferably 10 to 1000 μm.

(Electrolyte Layer)

The electrolyte to be used in the electrolyte layer of this embodiment is not particularly limited, and a liquid electrolyte, a gel polymer electrolyte, or an ionic liquid electrolyte is used from the viewpoint of ensuring the ion conductivity of the active material layer for the aforementioned non-aqueous electrolyte secondary battery.

The liquid electrolyte has a function as a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Further, as a lithium salt, a compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, or $LiCF_3SO_3$ can be similarly employed. The liquid electrolyte may further contain an additive in addition to the components described above. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. These cyclic carbonate esters may be used alone or in combination of two or more kinds thereof.

The gel polymer electrolyte has a configuration in which the aforementioned liquid electrolyte is injected to a matrix polymer (host polymer) consisting of an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA), and copolymers thereof.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion (($CF_3SO_2)_2N^-$), bis(pentafluoroethylsulfonyl)imide ion (($C_2F_5SO_2)_2N^-$), $BF_3C_2F_5^-$, tris(trifluoromethanesulfonyl) carbon acid ion (($CF_3SO_2)_3C^-$), perchlorate ion ($ClO_4^-$), dicyanamide ion (($CN)_2N^-$), organic sulfuric acid ion, organic sulfonic acid ion, $R^1COO^-$, $HOOCR^1COO^-$, $^-O$-$OCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide and N-methyl-N-propylpyrrolidinium bis(trifluoromethanesulfonyl)imide. These ionic liquids may be used alone or in combination of two or more kinds thereof.

The lithium salt which is used in the ionic liquid electrolyte is the same lithium salt which is used in the liquid electrolyte described above. Incidentally, the concentration of the lithium salt is preferably 0.1 to 2.0 M and more preferably 0.8 to 1.2 M.

An additive as described below may be added to the ionic liquid. When an additive is contained, charge/discharge characteristics and cycle characteristics may be further improved at a high rate. Specific examples of the additive include vinylene carbonate, ethylene carbonate, propylene carbonate, γ-butylolactone, γ-valerolactone, methyl diglyme, sulfolane, trimethylphosphate, triethylphosphate, methoxymethyl ethyl carbonate, and fluorinated ethylene carbonate. These may be used alone or in combination of two or more kinds thereof. The use amount when an additive is used is preferably 0.5 to 10% by mass and more preferably 0.5 to 5% by mass with respect to the ionic liquid.

Further, a separator may be used in an electrolyte layer. The separator has a function of holding an electrolyte so as to secure the lithium ion conductivity between a positive electrode and a negative electrode and a function of serving as a partition wall between a positive electrode and a negative electrode. In particular, in a case where a liquid electrolyte or an ionic liquid electrolyte is used as an electrolyte, it is preferable to use a separator.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyvinylidene fluoride-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a single layer or a multilayer. The fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the non-woven separator is not particularly limited as long as sufficient battery characteristics are obtained with an impregnated polymer gel electrolyte. Furthermore, it is sufficient that the thickness of the non-woven separator is the same as that of an electrolyte layer, and the thickness thereof is preferably 5 to 200 μm and particularly preferably 10 to 100 μm.

[Method for Producing Electrode]

The method for producing an electrode is not particularly limited, but first, a conductive member is formed on a current collector and then an active material layer is formed on the conductive member. Herein, the method for forming a conductive member on a current collector is not particularly limited, but there are mentioned 1) a method of transferring a conductive member, which is separately prepared from a current collector, on a current collector; 2) a method of pasting a conductive member, which is separately prepared from a current collector, to a current collector by a conductive adhesive member; 3) a method including a step of applying an ink containing a conductive material onto a current collector including a conductive resin layer to obtain a laminate in which a coating film is formed on the current collector; and the like. These production methods will be described.

[(1) Method of Transferring Conductive Member onto Current Collector]

In this method, a conductive member, which is separately prepared from a current collector including a conductive resin layer, is transferred onto a current collector.

As a method for separately preparing a conductive member from a current collector, for example, there is mentioned a method of applying an ink containing a conductive material and a solvent onto a heat-resistant film such as a polyimide film and drying the ink to obtain a conductive member. Further, when the conductive member contains a conductive material and a polymer material, this method is preferably employed. Incidentally, when the conductive member contains a conductive material and a polymer material, the conductive member can be obtained by, for example, a method of melting and mixing the conductive material and the polymer material (preferably, a thermoplastic polymer) and then rolling the melted-and-kneaded material by a heat pressing device or the like. That is, according to an embodiment of the present invention, there is provided a method for producing an electrical connection structure of the present invention including a step of applying an ink containing a conductive material to a current collector having a conductive resin layer containing a polymer material and a conductive filler, to obtain a laminate in which a coating film is formed on the current collector and a step of subjecting the laminate to heat pressing.

As a solvent used in the ink, for example, ketones such as acetone, aromatic hydrocarbon solvents such as toluene and xylene, polar solvents such as N-methyl-2-pyrrolidone (NMP), dimethylformamide (DMF), dimethylacetamide (DMAc), dimethylsulfoxide (DMSO), tetrahydrofuran (THF), and acetonitrile, and the like can be used. These may be used alone or may be used as a mixture of two or more kinds thereof.

The concentration of the conductive material in the ink is not particularly limited. The coating method is also not particularly limited, but examples thereof include coating with a brush, a bar coating method, a spray coating method, a screen printing method, and an inkjet method. Although the appropriate applied amount of the conductive material varies depending on the type of the conductive material and cannot be specified unconditionally, it is preferable to adjust the applied amount to such an amount that allows the contact resistance with the current collector to be small and the thickness of the conductive material not to be thick too much with respect to the thickness of the current collector. The drying temperature and the drying time are not particularly limited, and may be appropriately determined depending on a solvent in a range that deterioration of the material to be used does not occur.

As a method of transferring the conductive member obtained after drying or the conductive member obtained by melting and mixing, rolling, and the like onto the current collector, there are mentioned methods such as heat pressing using a known heat roll apparatus, heat pressing apparatus, or the like.

When the conductive member is prepared on the heat-resistant film, the electrical connection structure can be obtained by removing the heat-resistant film after transfer.

[(2) Method of Pasting Conductive Member and Current Collector to Each Other by Conductive Adhesive Member]

In this method, a conductive member, which is separately prepared from a current collector including a conductive resin layer, is pasted onto a current collector by using a conductive adhesive member. A method for separately producing a conductive member from a current collector is the same as the contents described in the above-described section and thus the description thereof is omitted herein.

The conductive adhesive member contains a monomer or oligomer having two or more thermally polymerizable groups in one molecule, a conductive material, a polymerization initiator, or the like.

Examples of the monomer or oligomer include bifunctional (meth)acrylate such as ethylene glycol di (meth) acrylate, diethylene glycol di(meth)acrylate, triethylene glycol di(meth)acrylate, tetraethylene glycol di(meth)acrylate, propylene glycol di (meth)acrylate, dipropylene glycol di (meth)acrylate, tripropylene glycol di(meth)acrylate, 1,3-butanediol di(meth)acrylate, 1,4-butanediol di(meth)acrylate, or 1,6-hexanediol di(meth)acrylate; trifunctional (meth) acrylate such as trimethylolpropane tri(meth)acrylate or pentaerythritol tri(meth)acrylate; and tetrafunctional (meth) acrylate such as ditrimethylolpropane tetra(meth)acrylate or pentaerythritol tetra(meth)acrylate. In addition to the above-described examples, monomers such as urethane (meth) acrylate, a copolymerization oligomer thereof, and a copolymerization oligomer with acrylonitrile are exemplified, but the monomer or oligomer is not limited thereto. Incidentally, the term "(meth)acrylate" described in the present specification indicates methacrylate and/or acrylate.

Further, examples of the conductive material include carbon materials such as acetylene black, Ketjen black, carbon black, graphite, vapor-phase grown carbon fibers, and carbon nanotube; and powder of metals such as gold, silver, copper, aluminum, nickel, and magnesium. Examples of the polymerization initiator include dicumyl peroxide, di-t-butyl peroxide, t-butyl peroxybenzoate, t-butyl hydroperoxide, benzoyl peroxide, and cumene hydroperoxide.

The monomer or oligomer, the conductive material, and the polymerization initiator respectively may be used alone or may be used as a mixture of two or more kinds thereof.

In the electrical connection structure obtained by such a production method, the in-plane variation of the contact resistance is reduced.

[(3) Method of Applying Ink onto Current Collector]

In this method, an ink containing a conductive material is applied onto a current collector to forma coating film on the current collector, thereby obtaining a laminate formed from the current collector and the conductive member. Incidentally, when the obtained laminate is further subjected to heat pressing, the electrical contact between the conductive filler and the conductive member is more efficient, and thus the contact resistance can be further reduced, which is preferable.

The solvent used in the ink, the concentration of the conductive material in the ink, the coating method, the drying conditions, and the like are the same as the contents described in the section of the above (1), and thus the description thereof is omitted herein.

When heat pressing is performed after the laminate is obtained, heat pressing can be performed by using a known heat roll apparatus, heat pressing apparatus, or the like. As an example of heat pressing conditions, when the polymer material contained in the conductive resin layer is polypropylene, heat pressing is preferably performed at a temperature range of 170 to 200° C. under the pressing condition that the conductive resin layer does not become thin. In particular, heat pressing is preferably performed at a temperature slightly higher than a melting point of the polymer material contained in the conductive resin layer. With such a temperature range, at least a part of the polymer material is melted and the conductive filler in the conductive resin layer and the conductive member are easily in contact with each other, which is preferable. Further, heat pressing is preferable since a structure as described above in which at least a part of the conductive member gets into the surface of the conductive resin layer can be easily obtained.

Among the methods (1) to (3), the method (1) or (3) is preferable, and the method (3) is more preferable. That is, the production method preferably includes a step of applying an ink containing a conductive material to a current collector having a conductive resin layer containing a polymer material and a conductive filler, to forma coating film on the current collector and thereby obtaining a laminate formed from the current collector and the conductive member, and the production method further preferably includes a step of subjecting the laminate to heat pressing. In other words, according to a more preferred embodiment of the present invention, the method for producing an electrical connection structure of the present invention includes a step of applying an ink containing a conductive material to a current collector having a conductive resin layer containing a polymer material and a conductive filler, to obtain a laminate in which a coating film is formed on the current collector and a step of subjecting the laminate to heat pressing to form the conductive member on the current collector. The reason for this is that according to the embodiment, the electrical contact between the conductive filler in the conductive resin layer and the conductive member is efficiently and stably formed and the contact resistance can be further reduced.

When the conductive member has a laminate structure of two or more layers, at least two layers of the conductive member are preferably pasted to each other by the conductive adhesive member. When pasting is performed by using the conductive adhesive member, the in-plane variation of the contact resistance can be reduced. The same conductive adhesive member as described in the section of the above (2) can be used as the conductive adhesive member used at this time, and there is no particular limitation.

After the conductive member is formed on the current collector as described above, an active material layer is formed on the conductive member. According to this, the electrode of the present invention can be produced. Herein, the method for forming an active material layer on the conductive member is not particularly limited, but the same method as a known method can be employed or a method with appropriate modification can be employed. Hereinafter, a preferred embodiment of the method for forming an active material layer on the conductive member will be described, but the present invention is not limited to the following embodiment. For example, a slurry is prepared by dispersing an active material and, as necessary, another component such as a binder in a predetermined dispersion solvent and this slurry is applied onto a separator, a conductive member, or a current collector and dried. Herein, a solvent which can be used as the dispersion solvent is not particularly limited, but for example, ketones such as acetone, aromatic hydrocarbon solvents such as toluene and xylene, polar solvents such as N-methyl-2-pyrrolidone (NMP), dimethylformamide (DMF), dimethylacetamide (DMAc), dimethylsulfoxide (DMSO), tetrahydrofuran (THF), and acetonitrile, and the like can be used. These may be used alone or may be used as a mixture of two or more kinds thereof. The concentration of the active material in the slurry is not particularly limited, but can be appropriately selected depending on the thickness of the active material layer, or the like. The coating method is also not particularly limited, but examples thereof include coating with a brush, a bar coating method, a spray coating method, a screen printing method, and an inkjet method. The applied amount of the active material is not particularly limited. The drying temperature and the drying time are not particularly limited. Incidentally, the drying may be performed under atmospheric pressure or under reduced pressure.

The electrical connection structure is suitably used in a lithium ion secondary battery. The lithium ion secondary battery is not limited to a flat shape of laminate type, and may be a winding type lithium ion secondary battery. The winding type lithium ion secondary battery may have a barrel shape or a flat and rectangular shape obtained by modifying the barrel shape, and thus there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such configuration.

In the lithium ion secondary battery, known knowledge of the related art is appropriately employed for a main component member (an active material layer, an electrolyte layer, a lead, an outer casing material, or the like) other than the electrical connection structure. Further, the lithium ion secondary battery can be produced by a known production method of the related art.

The lithium ion secondary battery having the electrical connection structure can be suitably used as a power source or an auxiliary power source for operating a vehicle, such as an electric vehicle, a hybrid electric vehicle, a fuel cell electric vehicle, or a hybrid fuel cell electric vehicle, requiring a high mass energy density, a high mass output density, or the like.

Further, the electrical connection structure is not limited to the use for the lithium ion secondary battery, but can also be applied to a secondary battery of another type, and further applied to a primary battery.

EXAMPLES

The electrical connection structure will be described in more detail by means of the following Examples and Comparative Examples; however, the electrical connection structure is not limited only to the following Examples and Comparative Examples. Incidentally, hereinafter, unless otherwise stated, operations were conducted at room temperature (25° C.)

Preparation Example 1: Preparation of Current Collector 1

Current collector 1 including conductive resin layer on the positive electrode side (Current Collector 1) was prepared as follows. That is, 75% by mass of polypropylene (PP) (trade name "SunAllomer (registered trademark) PL500A," manufactured by SunAllomer Ltd.), 20% bymass of acetylene black (AB) (DENKABLACK (registered trademark) HS-100, manufactured by Denka Company Limited, (average particle diameter of primary particles: 36 nm), and 5% by mass of dispersant (manufactured by Sanyo Chemical Industries, Ltd., trade name "UMEX (registered trademark) 1001," maleic anhydride modified polypropylene) were melted and kneaded by a twin screw extruder under conditions including 180° C., 100 rpm, and a retention time of 10 minutes to obtain a material 1 for a current collector. Incidentally, the amount of each of the components represents a mixing ratio, and the total of polypropylene, acetylene black, and the dispersant is 100% bymass. The obtained material 1 for a current collector was subjected to rolling by a heat pressing device to obtain a current collector 1 having a thickness of 100 µm (also referred to as "20% AB-PP").

Preparation Example 2: Preparation of Current Collector 2

Current collector 2 including conductive resin layer on the negative electrode side (Current Collector 2) was prepared as follows. 81% by mass of nickel (Ni) filler T255 (standard particle diameter of primary particles: 2.2 to 2.8 µm) manufactured by Nikko Rica Corporation, 14% by mass of polypropylene (PP) (trade name "SunAllomer (registered trademark) PL500A," manufactured by SunAllomer Ltd.), and 5% by mass of dispersant (manufactured by Sanyo Chemical Industries, Ltd., trade name "UMEX (registered trademark) 1001," maleic anhydride modified polypropylene) were melted and kneaded by a twin screw extruder under conditions including 180° C., 100 rpm, and a retention time of 10 minutes to obtain a material 2 for a current collector. Incidentally, the amount of each of the components represents a mixing ratio, and the total of the nickel (Ni) filler, polypropylene, and the dispersant is 100% by mass. The obtained material 2 for a current collector was subjected to rolling by a heat pressing device to prepare a current collector 2 having a thickness of 100 µm (also referred to as "81% Ni-PP").

Example 1: Preparation of Negative Electrode

A nickel (Ni) filler T225 (standard particle diameter of primary particles: 2.2 to 2.8 µm) manufactured by Nikko Rica Corporation was dispersed in N-methyl-2-pyrrolidone (NMP) to prepare a dispersion liquid. This dispersion liquid was applied onto a polyimide (Kapton (registered trademark), manufactured by DU PONT-TORAY CO., LTD.) film such that the applied amount (surface density) of the Ni filler became 6 mg/cm$^2$, and then the dispersion liquid was dried at 90° C. for 3 hours to form a coating film. Next, after the coating film was pasted to one surface of the current collector 2 and then hot pressing roll at 190° C. was applied thereto, the polyimide film was removed. Accordingly, a conductive member (thickness: 30 µm) was formed on one surface of the current collector 2 (laminate 1-1).

Next, a mixture of hard carbon, acetylene black (AB), and polyvinylidene fluoride (PVdF) (mass ratio: 90:5:5) was incorporated into N-methyl-2-pyrrolidone (NMP) to prepare a slurry. Incidentally, at this time, Carbotron (registered trademark) PS (F) manufactured by Kureha Battery Materials Japan was used as hard carbon. DENKA BLACK HS-100 (registered trademark) manufactured by Denka Company Limited (average particle diameter of primary particles: 36 nm) was used as acetylene black. This slurry was applied to a polypropylene (PP) separator (thickness: 25 µm) such that the applied amount (surface density) of hard carbon became 2.5 mg/cm$^2$, and then vacuum heating at 80° C. was performed thereon to form a negative electrode active material layer (thickness: 40 µm) on the separator (laminate 1-2). This laminate 1-2 was disposed to one surface of the laminate 1-1 such that the negative electrode active material and the conductive member were in contact with each other, and then the obtained product was punched into a disk shape having a diameter of 15 mm to thereby prepare a negative electrode. As a counter electrode for evaluation, a product obtained by punching metal lithium into a disk shape having a diameter of 15 mm was used. The counter electrode for evaluation was disposed to the surface, on which the negative electrode active material layer is not formed, of the polypropylene separator and this negative electrode and the counter electrode for evaluation were laminated via the separator to thereby prepare an electrode 1. This electrode 1 was put into a coin cell container, added with an electrolyte solution, and covered with a top cover to thereby prepare a coin cell 1 for evaluation. Incidentally, as the electrolyte solution, a solution in which 1 M LiPF$_6$ is dissolved in a mixture solvent of ethylene carbonate (EC) and dimethyl carbonate (DMC) (volume ratio: 1:1) was prepared.

Durability test 1 was performed on the coin cell 1 for evaluation obtained in this way, as follows. The result thereof is presented in the following Table 1.

[Durability Test 1]

The charge-discharge cycle test was performed in such a manner that the coin cell for evaluation was charged at 45° C. by CC-CV charging at a rate of 0.2 C up to 0 V with respect to Li and discharged by CC discharging at a rate of 0.2 C up to 2.0 V. The capacity retention rate (%) [=(capacity after test/initial capacity)×100] was obtained based on the capacity at the first cycle (initial capacity) and the capacity at the 50th cycle (capacity after test).

Comparative Example 1

A coin cell 2 for evaluation was prepared in the same manner as in Example 1, except that the conductive member was not formed in Example 1. Incidentally, an electrode (electrode 2) prepared in this example is obtained by forming the negative electrode active material layer directly on both surfaces of the current collector 2.

Next, the durability test 1 was performed on this coin cell 2 for evaluation in the same manner as in Example 1. The result thereof is presented in the following Table 1.

TABLE 1

| Charge-discharge cycle durability of coin cell | |
|---|---|
| | Capacity retention rate (%) after 50 cycles |
| Example 1 | 85 |
| Comparative Example 1 | 78 |

From the above Table 1, it is found that the electrode of Example 1 of the present invention is excellent in charge-discharge cycle durability in addition to Comparative Example 1 in which the conductive member is not provided between the current collector and the active material layer.

Example 2: Preparation of Positive Electrode

A dispersion liquid in which acetylene black (AB) is dispersed in N-methyl-2-pyrrolidone (NMP) (AB concentration: 20% by mass) was prepared. Incidentally, at this time, DENKA BLACK HS-100 (registered trademark) manufactured by Denka Company Limited (average particle diameter of primary particles: 36 nm) was used as acetylene black. This dispersion liquid was applied to a polyimide (Kapton (registered trademark), manufactured by DU PONT-TORAY CO., LTD.) film such that the applied amount (surface density) of acetylene black became 0.25 mg/cm$^2$, and then the dispersion liquid was dried at 90° C. for 3 hours to form a coating film. Next, after the coating film was pasted to one surface of the current collector 1 and then hot pressing roll at 180° C. was applied thereto, the polyimide film was removed. Accordingly, a conductive member (thickness: 10 μm) was formed on one surface of the current collector 1 (laminate 2-1).

Next, a mixture of LiCoO$_2$ (CELLSEED C-8G manufactured by Nippon Chemical Industrial CO., LTD.), acetylene black (AB), and polyvinylidene fluoride (PVdF) (mass ratio: 90:5:5) was incorporated into N-methyl-2-pyrrolidone (NMP) to prepare a slurry. Incidentally, at this time, DENKA BLACK HS-100 (registered trademark) manufactured by Denka Company Limited (average particle diameter of primary particles: 36 nm) was used as acetylene black. This slurry was applied to a polypropylene (PP) separator (thickness: 25 μm) such that the applied amount (surface density) of LiCoO$_2$ became 6.5 mg/cm$^2$, and then vacuum heating at 80° C. was performed thereon to form a positive electrode active material layer (thickness: 35 μm) on the separator (laminate 2-2). This laminate 2-2 was disposed to one surface of the laminate 2-1 such that the positive electrode active material and the conductive member were in contact with each other, and then the obtained product was punched into a disk shape having a diameter of 15 mm to thereby prepare a positive electrode. As a negative electrode, a product obtained by punching metal lithium into a disk shape having a diameter of 15 mm was used. The negative electrode was disposed to the surface, on which the positive electrode active material layer is not formed, of the polypropylene separator and this negative electrode and the positive electrode were laminated via the separator to thereby prepare an electrode 3. This electrode 3 was put into a coin cell container, added with an electrolyte solution, and covered with a top cover to thereby prepare a coin cell 3 for evaluation. Incidentally, as the electrolyte solution, a solution in which 1 M LiPF$_6$ is dissolved in a mixture solvent of ethylene carbonate (EC) and dimethyl carbonate (DMC) (volume ratio: 1:1) was prepared.

Durability test 2 was performed on the coin cell 3 for evaluation obtained in this way, as follows. The result thereof is presented in the following Table 2.

[Durability Test 2]

The charge-discharge cycle test was performed in such a manner that the coin cell for evaluation was charged at 45° C. by CC-CV charging at a rate of 0.2 C up to 4.2 V and discharged by CC discharging at a rate of 0.2 C up to 3.5 V. The capacity retention rate (%) [=(capacity after test/initial capacity)×100] was obtained based on the capacity at the first cycle (initial capacity) and the capacity at the 50th cycle (capacity after test).

Comparative Example 2

A coin cell 4 for evaluation was prepared in the same manner as in Example 2, except that the conductive member was not formed in Example 2. Incidentally, an electrode (electrode 4) prepared in this example is obtained by forming the positive electrode active material layer directly on both surfaces of the current collector 1.

Next, the durability test 2 was performed on this coin cell 4 for evaluation in the same manner as in Example 2. The result thereof is presented in the following Table 2.

TABLE 2

| Charge-discharge cycle durability of coin cell | |
|---|---|
| | Capacity retention rate (%) after 50 cycles |
| Example 2 | 89 |
| Comparative Example 2 | 70 |

From the above Table 2, it is found that the electrode of Example 2 of the present invention is excellent in charge-discharge cycle durability in addition to Comparative Example 2 in which the conductive member is not provided between the current collector and the active material layer.

The present application is based on Japanese Patent Application No. 2014-170646 filed on Aug. 25, 2014, and its enclosure is entirely incorporated herein by reference.

The invention claimed is:

1. An electrode comprising:
a current collector which is a conductive resin layer containing a mixture of a polymer material and a conductive filler; and
an active material layer,
wherein the electrode further includes only a granular-shaped, powder-shaped, or fiber-shaped conductive member, which is in electrical contact with the conductive filler, between the current collector and the active material layer, and
wherein the conductive member consists of at least one conductive material selected from the group consisting of at least one metal, an alloy having the at least one metal as a main component, or a conductive carbon, the at least one metal being selected from the group consisting of cobalt, nickel, tin, antimony, copper, silver, palladium, iridium, platinum, gold, iron, titanium, zirconium, tantalum, or niobium.

2. The electrode according to claim 1, wherein the electrode has a structure in which at least a part of the conductive member extends beyond the surface of the conductive resin layer and is present inside the conductive resin layer.

3. The electrode according to claim 1, wherein the conductive member is a granular-shaped or powder-shaped conductive material having an average particle diameter of primary particles of 0.01 to 3 µm or a fiber-shaped conductive material having an average fiber length of 0.1 to 100 µm and an average diameter of 0.01 to 3 µm.

4. The electrode according to claim 1, wherein the active material layer is a positive electrode active material layer and the conductive member is formed only from at least one granular-shaped, powder-shaped, or fiber-shaped conductive material selected from the group consisting of conductive carbon, titanium, or stainless steel.

5. A method for producing the electrode according to claim 1, the method comprising:

a step of applying an ink containing a solvent and at least one granular-shaped, powder-shaped, or fiber-shaped conductive material selected from the group consisting of at least one metal, an alloy having the at least one metal as a main component, or conductive carbon to a current collector which includes a conductive resin layer containing a polymer material and a conductive filler to obtain a laminate in which a conductive member formed only from the conductive material is formed on the current collector, the at least one metal being selected from the group consisting of cobalt, nickel, tin, antimony, copper, silver, palladium, iridium, platinum, gold, iron, titanium, zirconium, tantalum, or niobium; and a step of forming an active material layer on the conductive member.

6. The method for producing the electrode according to claim 5, further comprising a step of subjecting the laminate to heat pressing.

7. An electrode comprising:
a current collector which includes a conductive resin layer containing a polymer material and a conductive filler; and
an active material layer,
wherein the electrode further includes only a granular-shaped, powder-shaped, or fiber-shaped conductive member, which is in electrical contact with the conductive filler, between the current collector and the active material layer, wherein the active material layer is a negative electrode active material layer and the conductive member is formed only from at least one granular-shaped, powder-shaped, or fiber-shaped conductive material selected from the group consisting of nickel, copper, iron, or stainless steel.

* * * * *